Sept. 30, 1924.　　　　P. B. WOHLRAB　　　　1,510,432
　　　　　　　　　　　　STEERING GEAR
　　　　　　　　　　　Filed Oct. 1, 1923
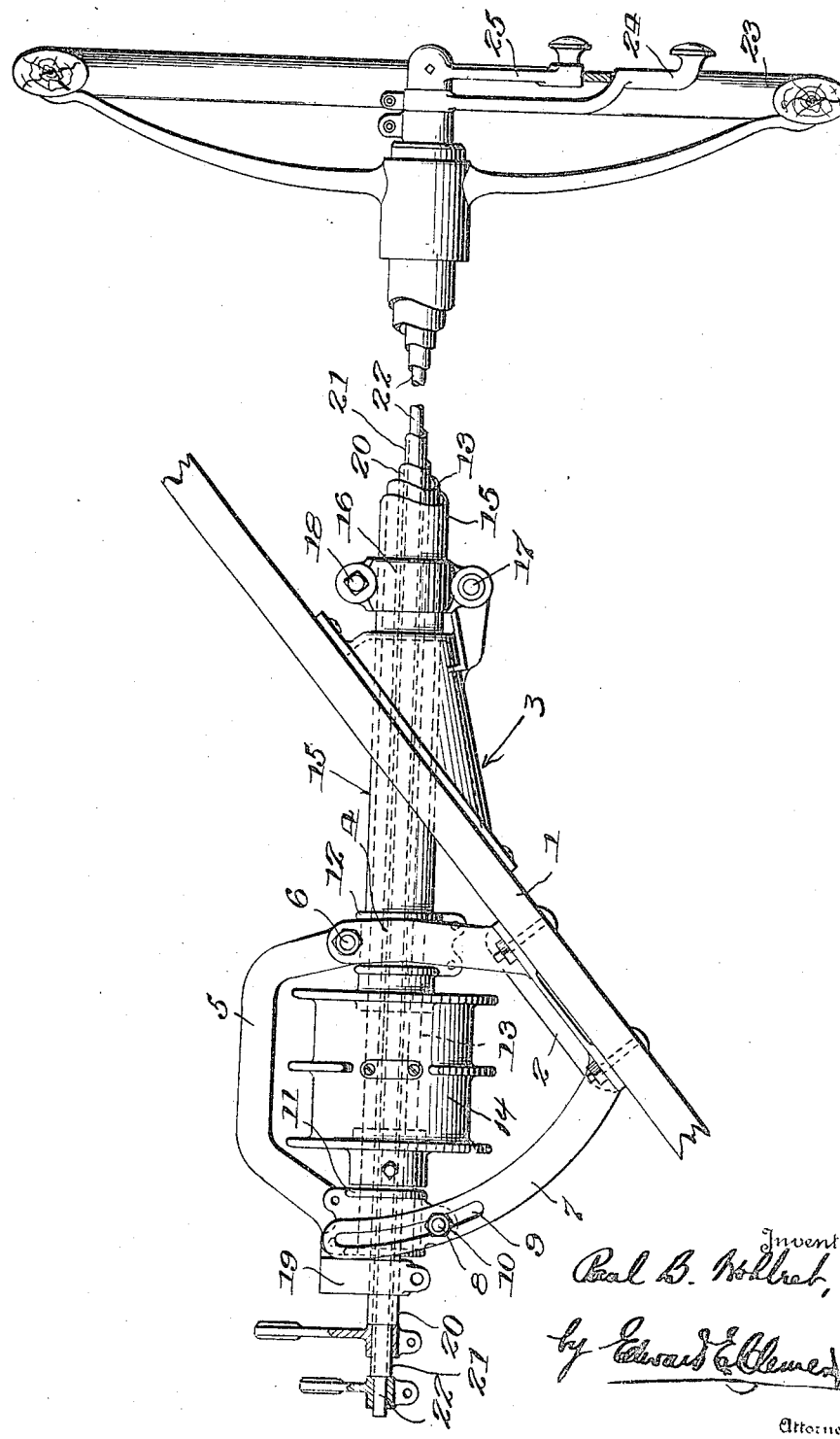

Patented Sept. 30, 1924.

1,510,432

UNITED STATES PATENT OFFICE.

PAUL B. WOHLRAB, OF RACINE, WISCONSIN.

STEERING GEAR.

Application filed October 1, 1923. Serial No. 665,978.

*To all whom it may concern:*

Be it known that PAUL B. WOHLRAB, citizen of the United States, residing at Racine, in the county of Racine and State of Wisconsin, has invented certain new and useful Improvements in Steering Gears, of which the following is a specification, reference being had therein to the accompanying drawing.

My invention relates to steering gears and more particularly to steering gears for motor boats and the like.

The object of the invention is to provide a steering gear having an adjustable mounting enabling the gear and steering post to be set at various angles to compensate for variation in design of different vehicles, thus reducing the time and expense incident to fitting the usual steering post and gear with fixed mountings to different types of vehicles.

My invention is illustrated in the accompanying drawing which is a side elevation of the device mounted on the dash board of a vehicle.

Referring to the drawing in detail, 1 indicates the dash board of a vehicle or forward bulkhead of a motor boat to which are directly secured the forward and rear mounting brackets 2 and 3, respectively. The forward bracket 2 carries a forked standard 4 at the top of which is mounted the bearing yoke 5 by means of the pivot bolt 6. The forward end of the bearing yoke 5 is supported on a forward, forked standard 7 also caried by the bracket 2, the yoke being adjustably secured to the standard 7 by means of a bolt 8 fixed to the forward end of the yoke 5 and passing through an arcuate slot 9 in the standard 7 and adapted to be clamped in various angular adjustments about the pivot bolt 6 by means of a clamping nut 10. A pair of front and rear bearings 11 and 12, respectively, are fixed in the bearing yoke 5, in which bearing is journaled the usual hollow steering post 13 on which is fixed the steering drum 14 between the bearings. A steering post casing 15 is fixed to and extends from the rear face of the bearing 12 through the conical bracket 3 at the rear end of which it is held in an angularly adjustable supporting collar pivoted to the bracket at 17 and adapted to clamp the casing 15 through the use of the clamping bolt 18.

The forward end of the bearing yoke also has fixed thereto a clamp 19 which holds the forward end of the casing 20 enclosing the concentric control shafts 21 and 22. The other portions of the steering control mechanism namely the steering wheel 23 with its connections with the steering post, the control levers 24 and 25 and their connections with the concentric control shafts 21 and 22, are of the usual and well known type and, as their specific form and structure does not constitute an essential part of the invention defined in the appended claims, a further detailed description of them is deemed unnecessary to a complete understanding of the invention by those skilled in the art.

Having thus described my invention, what I claim is:

1. An adjustable steering gear comprising a bracket having front and rear standards, a bearing yoke pivotally mounted attached to the rear standard and adjustably attached to the front standard, a pair of bearings carried by said yoke, a steering post journaled in said bearings, and a steering drum fixed to said post between the bearings.

2. An adjustable steering gear comprising a bracket having front and rear standards extending therefrom, a bearing yoke having one of its arms pivotally mounted in the rear standard and the other arm adjustably secured to the front standard, a pair of steering post bearings mounted in the arms of the bearing yoke one below the pivot connection and the other above the adjustable connection of the yoke with standards.

3. An adjustable steering gear comprising a bracket, having a pair of standards spaced apart, an arched yoke connecting the ends of the standards, said yoke being pivotally connected to one standard and adjustably connected with the other to allow adjustment of the yoke about the pivotal connection, a pair of shaft bearings mounted in the arms of the yoke, a hollow steering post journaled in the bearings, a steering drum fixed to the post between the bearings, a shaft casing passing through the hollow steering post, and a clamp for said shaft casing carried by the adjustable end of the yoke.

4. An adjustable steering gear comprising a front bracket adapted to be mounted on the front side of a mounting board, a front and rear standard carried by said bracket, an arched bearing yoke connecting said standards to form an encircling frame, said yoke being pivotally connected with the rear standard and adjustably connected to the front standard for adjustment about the pivotal connection a pair of steering post bearings carried by the arms of the yoke near the points of its connection with the standards, a steering post journaled in said bearings, a steering drum fixed to the post between the bearings so as to be positioned within the encircling frame formed by said yoke, bracket and standards, a casing surrounding the steering post and extending rearwardly from the rear bearing, a rear bracket for the casing adapted to be mounted on the rear side of the mounting board and a casing clamp pivotally connected to said rear bracket.

In testimony whereof I hereunto affix my signature.

PAUL B. WOHLRAB.